United States Patent [19]

Pernet

[11] Patent Number: 5,252,815
[45] Date of Patent: Oct. 12, 1993

[54] COMPACT SMART CARD READER WITH UNITARY CASE AND CONNECTOR COVER

[75] Inventor: Michel Pernet, Doubs, France

[73] Assignee: Alcatel Cit, Paris, France

[21] Appl. No.: 772,800

[22] Filed: Oct. 8, 1991

[30] Foreign Application Priority Data

Oct. 8, 1990 [FR] France .................................. 90 12356

[51] Int. Cl.$^5$ .............................................. G06K 17/06
[52] U.S. Cl. ...................................... 235/441; 235/492
[58] Field of Search ......................... 235/441, 483–486, 235/492

[56] References Cited

U.S. PATENT DOCUMENTS

| 4,004,133 | 1/1977 | Hannan et al. | 235/487 |
| 4,780,603 | 10/1988 | Hamada | 235/492 |
| 4,780,791 | 10/1988 | Morita | 235/492 |
| 4,795,895 | 1/1989 | Hara et al. | 235/492 |
| 5,091,618 | 2/1992 | Takahashi | 235/441 |

FOREIGN PATENT DOCUMENTS

| 0190527 | 8/1986 | European Pat. Off. |
| 0231409 | 8/1987 | European Pat. Off. |
| 0274288 | 7/1988 | European Pat. Off. |
| 0366513 | 5/1990 | European Pat. Off. |

Primary Examiner—Harold Pitts
Assistant Examiner—Stephone B. Allen
Attorney, Agent, or Firm—Sughrue, Mion, Zinn, Macpeak & Seas

[57] ABSTRACT

A smart card reader suitable for use in a pocket radiotelephone comprises a case enclosing the other parts of the reader including a printed circuit board and an arrangement for fixing the printed circuit board to the case. A smart card connector comprises an insulative frame carrying spring contacts, a cover for exerting pressure on a smart card and an arrangement for fixing the frame to the cover. The connector cover is integral with the case and the arrangement for fixing the frame to the cover fixes the frame direct to the case.

5 Claims, 2 Drawing Sheets

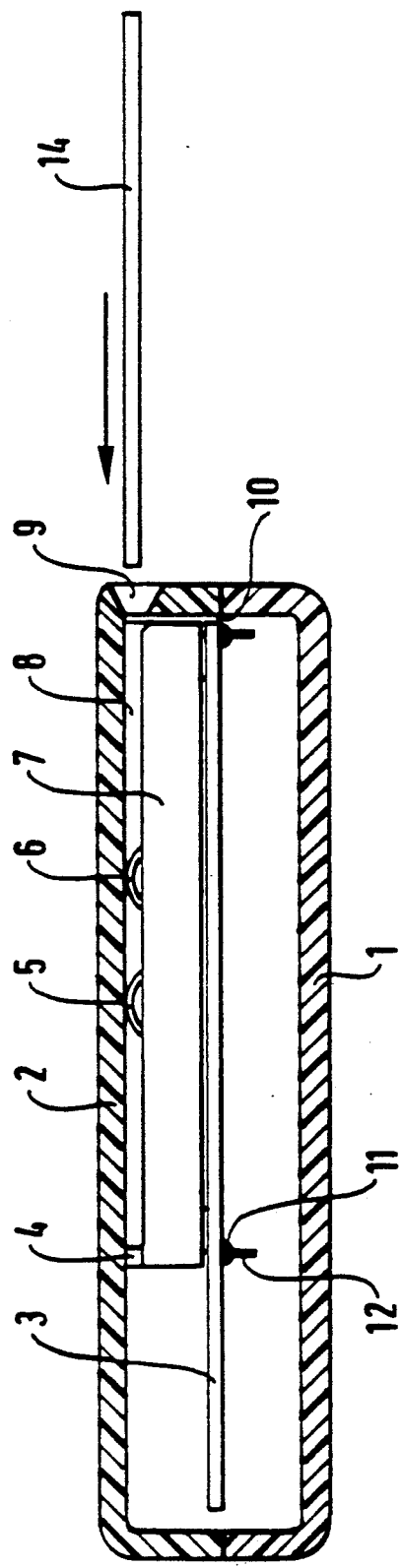
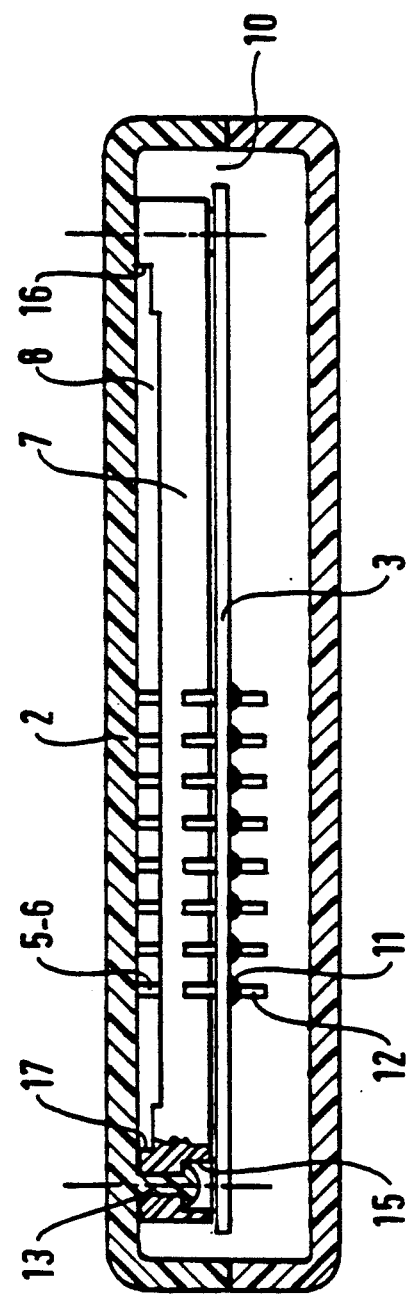

COMPACT SMART CARD READER WITH UNITARY CASE AND CONNECTOR COVER

BACKGROUND OF THE INVENTION

1. Field of the Invention

The invention concerns a compact smart card reader.

2. Description of the Prior Art

A smart card reader is usually a subsystem within a system such as a sales transaction terminal, a taxiphone, etc. It is used to read or write information in a silicon integrated circuit microchip. The chip is accommodated within the thickness of a card and is accessible electrically via conductive lands on the card surface. A reader usually comprises: a connector, a printed circuit board carrying electronic components and the connector, a case which is generally shared by the reader and other subsystems of a system, and means for fixing the printed circuit board to the case.

The card is inserted into the connector through a slot in the case. The connector conventionally comprises means for guiding the card as it is inserted into the connector, means for positioning it accurately within the connector and spring contacts bearing on the conductive lands on the card to make the connections. Accurate positioning of the card relative to the spring contacts is vital to obtaining a low contact resistance without rapid wear of the conductive lands and the spring contacts.

It is known, specifically from French patent application No 2 623 313, to produce a smart card connector comprising a plastics material frame carrying the spring contacts and a cover parallel to the plane of the frame and to the plane of the card. This document describes a card connector in which all dimensional tolerances are determined by the contact-holder frame, which can be a molded part combining great accuracy with low cost. Movement of the card in its own plane is guided by two parallel slideways which are integrated into the cover or into the frame. The cover rests on supports integral with the frame and defining accurately the gap between the cover and the frame. The cover determines the distance between the card and the spring contacts. It applies pressure to the card as a reaction force to the pressure exerted by the contacts.

A number of centering studs are integrated into the frame and nested within holes on the cover position the cover relative to the frame. The cover is riveted or screwed to the frame. The connector assembly is conventionally fixed to a printed circuit board by soldering leads which extend the spring contacts. The printed circuit board may be screwed or riveted to a case.

European patent application EP 0 274 288 describes a smart card reader adapted to be mounted inside an electronic system and comprising:
- a case in two parts surrounding the reader assembly;
- a printed circuit board carrying on one side the electronic components of the reader;
- a smart card connector primarily comprising an insulative frame carrying spring contacts.

The insulative frame is overmolded onto the spring contacts. The frame is disposed on the same side as the printed circuit board as the components. One end of each spring contact passes through the printed circuit board and is soldered to the unoccupied side of the board. The printed circuit board and the frame are enclosed between the two parts of the case. The frame is positioned relative to the first part, on the unoccupied side of the printed circuit board, by two pegs which pass with clearance through two holes in the printed circuit board and nest within two holes in the first part. The second part, on the side carrying the frame and the components, is fixed to the first part at its perimeter.

The second part serves as a guide table for the smart card and exerts on it a pressure as a reaction force to the pressure of the spring contacts. It therefore has the same function as the cover of the connector described in French patent application No 2 623 313. The device described in European patent application No 0 274 288 is therefore simpler than that described in French patent application No 2 623 313, but is wanting in precision. The position of the card relative to the spring contacts depends on the assembly tolerances of the frame relative to the first case part plus the assembly tolerances of the first case part relative to the second part, which guides the card.

Consideration is being given to producing portable devices incorporating a smart card reader. For example, pocket radiotelephones may incorporate a smart card reader as a means of payment, as a means of identifying the user, etc. For applications like these it is desirable to minimize the overall dimensions of the smart card reader and possibly also to reduce its cost to encourage adoption of this type of device by the public.

An object of the invention is to reduce the overall dimensions of a device of this kind without compromising the accuracy with which the card is positioned relative to the contacts.

SUMMARY OF THE INVENTION

The present invention consists in a Smart card reader comprising:
- a case enclosing the other parts of the reader;
- a printed circuit board;
- means for fixing the printed circuit board to the case: and
- a smart card connector comprising:
  - an insulative frame carrying spring contacts;
  - a cover integral with said case for exerting pressure on a smart card; and
  - means for fixing said frame direct to said case.

This reader is of reduced overall dimensions and cost as compared with a conventional reader but positions the card accurately. Positioning is conditioned only by the assembly tolerances of the frame relative to the cover integral with the case, as there is no intermediate part for fixing the frame to the cover integrated with the case.

The invention will be better understood and other features of the invention will emerge from the following description and the appended drawings.

BRIEF DESCRIPTION OF THE DRAWINGS

FIG. 1 shows a first embodiment of a device in accordance with the invention in cross-section.

FIG. 2 is another cross-section view of the first embodiment.

DETAILED DESCRIPTION OF THE INVENTION

Figure 3:
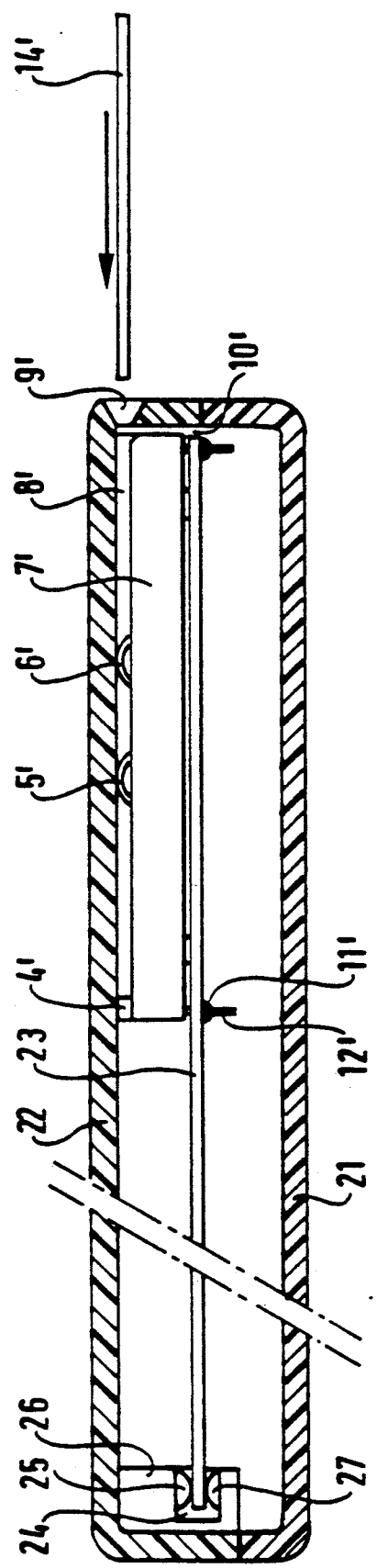
FIG. 3 shows a second embodiment of a device in accordance with the invention in cross-section.

FIG. 1 shows an embodiment comprising:

a molded plastics material case of two half cases 1 and 2 containing, for example, all of the subsystems of a pocket radiotelephone including a smart card reader;

a rigid printed circuit board 3;

an insulative frame 7 carrying spring contacts 5 and 6 extended by leads 12 soldered to the printed circuit board 3.

The half-case 2, the spring contacts 5 and 6 and the insulative frame 7 constitute a smart card connector, the half-case 2 functioning both as the radiotelephone case and the connector cover. The card 14 is inserted into the case between the inside wall of the half-case 2 and the contacts 5 and 6 through a bevelled slot 9. In the area where it constitutes the connector cover, the inside wall of the half-case 2 has a flat and smooth surface. The frame 7 is generally flat and its plane is parallel to the plane of the inside wall of the half-case 2. It may be made in a manner similar to that described in French patent application No 2 623 313. Supports 4 integral with the perimeter of the frame 7 bear against the inside walls of the half-case 2 and define accurately the gap between this wall and the frame 7. The inside wall of half case 2 exerts pressure on the card 14 as a reaction force to the pressure exerted by the spring contacts 5 and 6 when the card 14 is inserted in the connector.

The shape of the half-case 1 is such that it constitutes, when joined with the half-case 2, a closed case. They may be fastened together by conventional means (not shown) such as screws. The case may contain other subsystems (not shown) providing all the functions of the pocket radiotelephone.

A clearance 10 is provided all around the printed circuit board 3 so that it is able to assume the position imposed by its fixing to the frame 7 which is fixed accurately relative to the half-case 2 by rivets 13 integral with the latter.

FIG. 2 is a view of the same embodiment in cross-section in a plane at right angles to that of FIG. 1. FIG. 2 shows in partial cross-section one corner of the frame 7 to show how the frame 7 is fixed to the case. The fixing means comprise four rivets 13 integral with the half-case 2 which is molded from plastics material. Each rivet is nested within a hole at one corner of the frame 7. This hole incorporates a shoulder 15 for retaining the frame 7 following peening of the head of the rivet 13 at raised temperature.

In this embodiment the printed circuit board 3 is a compact rigid circuit board and therefore light in weight. For this reason no means are provided of fixing the printed circuit board 3 in addition to the soldered joints 11 fixing it to the leads 12 extending the spring contacts 5, 6. The leads 12 are solidly attached to the frame 7 because the latter is overmolded onto them. The frame 7 is fixed to the case by the previously mentioned rivets 13.

FIG. 2 shows also that the frame 7 comprises two parallel slideways 17 and 16 adapted to guide translation movement of the card 14 as it is inserted into the reader.

In an alternative version of this first embodiment the inside wall of the cover integral with the half-case 2 is not flat and smooth but comprises guide slideways and a boss exerting an increased pressure in the area of the card containing the conductive lands. These slideways and the boss are molded from plastics material at the same time as the remainder of the half-case 2, in particular the rivets 13.

In another alternative version of this first embodiment the printed circuit board 3 may be a flexible printed circuit whose function is to connect the connector to an electronic subsystem, for example.

FIG. 3 shows a second embodiment of a reader in accordance with the invention comprising a rigid printed circuit board 23 much larger than the connector frame, so that additional fixing means are required. The connector comprises parts analogous to those described previously with reference to FIGS. 1 and 2. These analogous parts have the same reference number "primed".

A clearance 10, is provided all around the printed circuit board 23 but one end of the board is fixed to the case by a clamp, indicated generally at 29. The other end is fixed to the case by soldered joints 11' on the leads 12' of the card connector. The case comprises two half-cases 21 and 22, the half-case 22 constituting the card connector cover.

The clamp 29 comprises a groove 24 integral with the half-case 22 whose two flanks are parallel to each other and to the plane of the printed circuit board 23. The two flanks are faced with respective flexible plastic material members 25 and 27 which are semi-cylindrical in shape and clamp the end of the circuit board 23. The clamping line of the clamp 29 may extend across the entire width of the board. In an alternative version of this second embodiment a plurality of separate clamps are disposed widthwise, each clamping only part of the edge of the printed circuit board.

A clearance is provided between the end of the printed circuit board 23 and the bottom of the groove 24 and the members 25 and 27 are semi-cylindrical so that the printed circuit board 23 can pivot about the clamp 29 to enable the installation of the printed circuit board 23 fitted with the frame 7' and to allow it to assume the position imposed by its attachment to the frame 7'. On the other hand, this clamp 29 opposes movement of the printed circuit board in a direction perpendicular to its plane, in response to an impact, for example.

In another alternative version of this second embodiment the groove does not comprise any flexible material members 25, 27 because the printed circuit board 23 is sufficiently flexible to be fitted without this facility.

In one version of the smart card reader the two halves of the case are cast from metal. In this case the frame 7 is preferably fixed by screws.

Figure 4:
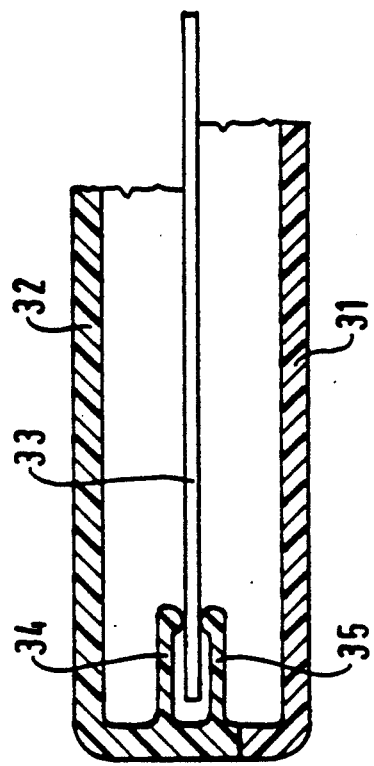
FIG. 4 shows in cross-section part of an alternative version of the second embodiment.

FIG. 4 shows a version of the second embodiment in partial cross-section. The reader comprises a rigid printed circuit board 33 much larger than the card connector. It is fixed to the half-case 32 by a clamp indicated generally at 30 as well as by the soldered joints 11'. The clamp 30 comprises two leaf springs 34 and 35 integral with the half-case 32 and gripping a section of the edge of the printed circuit board 33. The width of the clamp 30 can be equal to the width of the circuit board 33 or the clamp 30 can be divided into a number of separate clamp sections disposed widthwise. The two leaf springs 34 and 35 are symmetrical relative to the printed circuit board 33. Each has a rounded end to allow the printed circuit board 33 to pivot about the clamp line during installation of the printed circuit board 33 and so that it is able to assume the position imposed by its attachment to the frame 7' of connector. The leaf springs 34 and 35 are integrally molded from plastics material at the same time as the molding of the half-case 32.

There is claimed:

1. Smart card reader comprising:
a case enclosing other parts of the reader;
a printed circuit board;
means for fixing the printed circuit board interiorly to the case; and
a smart card connector comprising:
an insulative frame carrying spring contacts;
a cover integral with said case for exerting pressure on a smart card; and
means for fixing said frame directly to said case interiorly of the case and facing an internal wall of the case with said frame extending parallel to said internal wall, and a slot opening through said case, and wherein said spring contacts project from said frame on a side thereof facing the internal wall of the case and in the path of a smart card insertable through said slot, whereby the reader is of simplified construction, of reduced overall dimension and positioning of the card is conditioned only by the assembly tolerances of the frame relative to the internal wall of the case and thereby eliminates the need for an intermediate part for fixing of the frame to the case which acts as a connector cover.

2. Smart card reader according to claim 1 wherein said means for fixing said printed circuit board to said case comprise only:
soldered joints fixing said printed circuit board to leads extending said contacts.

3. Smart card reader according to claim 1 wherein said printed circuit board is rigid and said means for fixing said printed circuit board to said case comprise at least one internal clamp provided with a groove and being integral with said case and having two flanks faced with respective flexible material members shaped to allow pivoting of said printed circuit board around a clamp line of said clamp defined by said two flank members and gripping between said members at least one segment of one edge of said printed circuit board.

4. Smart card reader according to claim 1 wherein said printed circuit board is rigid and said means for fixing said printed circuit board to said case comprise at least one internal clamp formed by two leaf springs integral with said case and gripping therebetween at least one segment of one edge of said printed circuit board and enabling pivoting of said printed circuit board about a clamp line of said clamp defined by said leaf springs.

5. Smart card reader according to claim 1 wherein said case is molded from plastics material and said means for fixing said frame to said case comprise rivets integral with said case passing through holes in said frame and centering said frame relative to said case.

* * * * *